(12) United States Patent
Winner

(10) Patent No.: US 10,552,858 B1
(45) Date of Patent: Feb. 4, 2020

(54) RECONCILIATION OF DISJOINT USER IDENTIFER SPACES

(71) Applicant: Twitter, Inc., San Francisco, CA (US)

(72) Inventor: Jeffrey Winner, Los Altos, CA (US)

(73) Assignee: Twitter, Inc., San Francisco, CA (US)

(*) Notice: Subject to any disclaimer, the term of this patent is extended or adjusted under 35 U.S.C. 154(b) by 752 days.

(21) Appl. No.: 14/796,609

(22) Filed: Jul. 10, 2015

(51) Int. Cl.
G06Q 30/02 (2012.01)
H04L 29/08 (2006.01)
G06Q 50/00 (2012.01)
G06F 16/22 (2019.01)

(52) U.S. Cl.
CPC ..... G06Q 30/0226 (2013.01); G06F 16/2255 (2019.01); G06Q 30/0242 (2013.01); G06Q 30/0273 (2013.01); G06Q 50/01 (2013.01); H04L 67/1095 (2013.01)

(58) Field of Classification Search
None
See application file for complete search history.

(56) References Cited

U.S. PATENT DOCUMENTS

| | | | |
|---|---|---|---|
| 10,055,754 | B2 | 8/2018 | Brown et al. |
| 10,204,239 | B2 | 2/2019 | Dabbiru et al. |
| 10,423,985 | B1 | 9/2019 | Dutta et al. |
| 2006/0004892 | A1* | 1/2006 | Lunt ............... G06F 17/30864 |
| 2007/0128899 | A1 | 6/2007 | Mayer |
| 2009/0077645 | A1 | 3/2009 | Kottahachchi |
| 2011/0239284 | A1 | 9/2011 | Kaji et al. |
| 2012/0303425 | A1* | 11/2012 | Katzin ............... G06Q 20/027 705/14.4 |
| 2013/0124309 | A1 | 5/2013 | Traasdahl et al. |
| 2014/0095297 | A1 | 4/2014 | O'Reilly |
| 2014/0244351 | A1* | 8/2014 | Symons ............. G06Q 30/0201 705/7.29 |
| 2014/0279837 | A1 | 9/2014 | Guo et al. |
| 2014/0365296 | A1 | 12/2014 | McDonnell et al. |
| 2015/0134459 | A1 | 5/2015 | Dipaola |
| 2015/0242885 | A1 | 8/2015 | Alsina et al. |
| 2016/0203338 | A1 | 7/2016 | Dabbiru et al. |

FOREIGN PATENT DOCUMENTS

WO 2010035949 A2 4/2010

OTHER PUBLICATIONS

Hash Function https://en.wikipedia.org/wiki/Hash_function, Feb. 28, 2008, Wikipedia (Year: 2008).*

* cited by examiner

Primary Examiner — Michael W Schmucker
(74) Attorney, Agent, or Firm — Smith Baluch LLP

(57) ABSTRACT

A system is described that receives first user identifiers from a first user space and a first set of hash values generated from a hash function applied to first information that identify users associated with the set of first user identifiers. The system determines a hash value included in both of the first set of hash values and a second set of hash values that are generated from the hash function being applied to second information that identify users associated with second user identifiers from a second user space. The system generates a mapping between the first user identifiers and the second user identifiers that each correspond to the same hash value. The system determines targeted information directed to the first user identifiers and based on the mapping, outputs the targeted information to user devices associated with the second user identifiers.

22 Claims, 6 Drawing Sheets

RECONCILIATION OF DISJOINT USER IDENTIFER SPACES

BACKGROUND

Computing systems may maintain user identifiers (IDs) that provide for authentication and authorization of users with such systems. Collectively, a set of user identifiers may constitute a user ID space. Two entities with separate computing systems may wish to collaborate and communicate about the individual people that maintain user accounts in each of their respective user ID spaces. For example, two merchant partners may maintain separate computing systems with distinct user ID spaces, and may want to identify areas of overlap between their respective merchant loyalty programs for offering services and/or benefits to the people that are members of both loyalty programs.

Unfortunately, the user ID space of each entity may be very large and the respective computing systems may each use a different user ID to reference the same individual person. In addition, the technical capabilities and resources of one or more of the entities may be limited and reconciling user ID spaces may be challenging. Accordingly, without sharing sensitive personal identifiable information (e.g., name, telephone number, address, and the like) about their respective users, reconciling two or more unique user ID spaces between multiple computing systems may be a difficult if not at least complex and time consuming task.

SUMMARY

In one example, the disclosure is directed to a method that includes receiving, by a computing system, a set of first user identifiers from a first user space and a first set of hash values, wherein the first set of hash values are generated from a hash function applied to first information that identify users associated with the set of first user identifiers, and determining, by the computer system, at least one hash value that is included in both of the first set of hash values and a second set of hash values, wherein the second set of hash values are generated from the hash function being applied to second information that identify users associated with a set of second user identifiers from a second user space. The method further includes generating, by the computing system, a mapping between a first user identifier from the set of first user identifiers and a second user identifier from set of second user identifiers, wherein the first user identifier and the second user identifier each correspond to the at least one hash value, and determining, by the computing device, based on the first user space, targeted information directed to the first user identifier, and outputting, by the computing system, based on the mapping, the targeted information to a user device associated with the second user identifier.

In another example, the disclosure is directed to computing system that includes at least one processor and at least one module operable by the at least one processor to receive a set of first user identifiers from a first user space and a first set of hash values, wherein the first set of hash values are generated from a hash function applied to first information that identify users associated with the set of first user identifiers, and determine at least one hash value that is included in both of the first set of hash values and a second set of hash values, wherein the second set of hash values are generated from the hash function being applied to second information that identify users associated with a set of second user identifiers from a second user space. The at least one module is further operable by the at least one processor to generate a mapping between a first user identifier from the set of first user identifiers and a second user identifier from set of second user identifiers, wherein the first user identifier and the second user identifier each correspond to the at least one hash value, determine, based on the first user space, targeted information directed to the first user identifier, and output, based on the mapping, the targeted information to a user device associated with the second user identifier.

In another example, the disclosure is directed to a method that includes receiving, by a reconciliation system, from a first computing system, a set of first user identifiers from a first user space and first information from the first user space that is associated with the set of first user identifiers, and receiving, by the reconciliation system, from a second computing system, a set of second user identifiers from a second user space and second information from the second user space that is associated with the set of second user identifiers. The method further includes determining, by the reconciliation system, a first set of hash values associated with the set of first user identifiers by applying a hash function to the first information from the first user space, and determining, by the reconciliation system, a second set of hash values associated with the set of second user identifiers by applying the hash function to the second information from the second user space. The method further includes generating, by the reconciliation system, based on the first set of hash values and the second set of hash values, a mapping between the set of first user identifiers from the first user space to the set of second user identifiers from the second user space that share matching hash values, and receiving, by the reconciliation system, from the second computing system, a query of a particular user identifier from the set of first user identifiers. The method further includes determining, by the reconciliation system, based on the mapping, a particular second user identifier from the set of second user identifiers that maps to the particular first user identifier, and outputting, by the reconciliation system, to the second computing system, an indication of the particular second user identifier.

In another example, the disclosure is directed to a computer-readable storage medium including instructions that, when executed, configure one or more processors of a first computing system to receive, from a second computing system, targeted content designated for a particular user from a second user space of the second computing system, and output, to a reconciliation system, an indication of a second user identifier that identifies the particular user in the second user space. The instructions, when executed, further configure the one or more processors of the first computing system to responsive to outputting the indication of the user identifier, receive, from the reconciliation system, an indication of a first user identifier that identifies the particular user in a first user space of the first computing system; and output, to a user device associated with the first user identifier, an indication of the target content designated for the particular user.

The details of one or more examples are set forth in the accompanying drawings and the description below. Other features, objects, and advantages of the disclosure will be apparent from the description and drawings, and from the claims.

DETAILED DESCRIPTION

Figure 1:
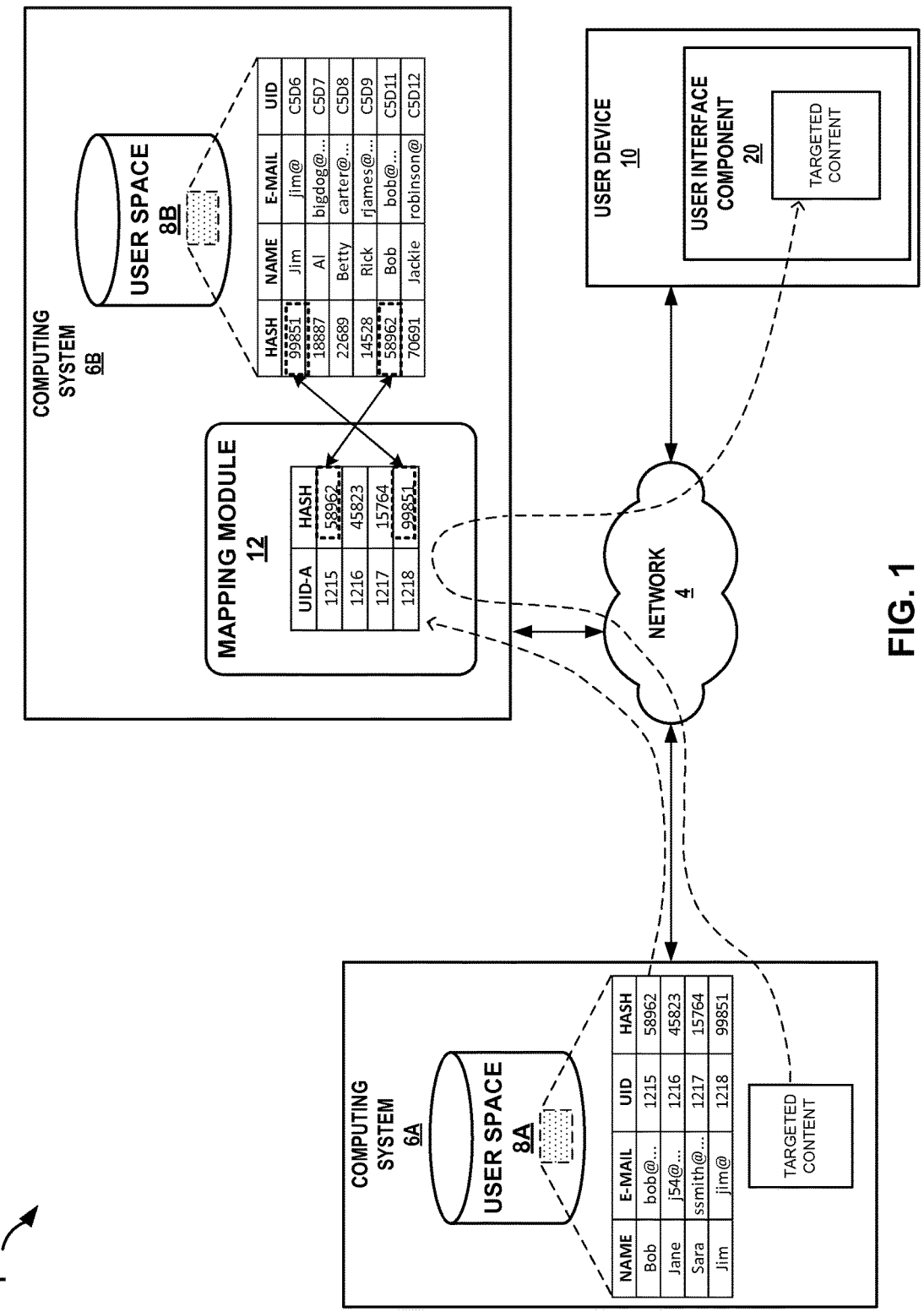
FIG. 1 is a conceptual diagram illustrating an example system for reconciling user identifiers from user spaces of multiple, different computing systems, in accordance with one or more aspects of the present disclosure.

In general, techniques of this disclosure may enable a computing system to reconcile the respective user spaces (also referred to herein as "user identifier spaces" or simply "user ID spaces") of two or more computing systems, without referencing or having access to personally identifiable information (PII) about each of the individual users in each of the respective user spaces. As such, even if the two or more computing system are associated with non-technical entities (e.g., retail stores, non-technical service providers, entities with technical resource constraints, or other entities without institutional knowledge and/or technical resources for solving engineering problems), the computing system may provide the two or more computing systems of the non-technical entities to better collaborate by anonymously reconciling user spaces.

For example, as part of a media service, a first computing system may output messages and/or media content to users of a first user space. A second computing system, that maintains a second user space, may wish to partner with the first computing system to have the first computing system provide, via the media service, targeted content (e.g., promotional discounts or other advertising) to the users of the second user space that are also users of the first user space. Rather than exchange PII or other information between the two computing systems to identify the users from the second user space that are also users from the first user space, the first and second computing systems may preserve the anonymity of their respective user spaces by instead relying on hashing techniques to identify areas of overlap between the two user spaces.

In operation, the first and second computing systems may determine a common type or category of information (e.g., telephone number, e-mail address, mailing address, birthdate, or other type of PII) that each system maintains about the respective users in each of the two user spaces. The second system may apply a hash function to the common type of information associated with the users from the second user space and provide the hash values generated by the hash function to the first computing system. The first system may apply the same hash function to the same, common type of information associated with the users from the first user space. Since the two systems have hashed the common type of PII from each user space using the same hash function, the first computing system may develop a mapping between the first user space and the second user space. For instance, the first computing system may compare the hash values received from the second computing system to determine which of the hash values associated with users from the first user space match hash values associated with users from the second user space.

With a mapping between the first user space and the second user space, the first and second computing systems may reference the hash values when referring to specific users. In this way, the first and second computing systems can communicate about which users from the first user space are to receive the targeted content from the second computing system. For example, based on the mapping, the first computing system may output content that is targeted towards users of the second user space, to a user device associated with a user from the first user space who is also a user of the second user space.

FIG. 1 is a conceptual diagram illustrating system 1 for reconciling user identifiers from user spaces of multiple, different computing systems 6A and 6B, in accordance with one or more aspects of the present disclosure. System 1 includes computing system 6A and computing system 6B (collectively "computing systems 6"), network 4, and user device 10.

Network 4 represents any communication network (e.g., public, private, commercial, governmental, or residential) that communicatively links two or more computing devices or systems for the transmission of information. For example, network 4 may be a wireless and/or wired network for transmitting data between two or more computing devices located at two or more different physical locations. In some examples, network 4 may represent the Internet. User device 10 and computing systems 6 may send and receive data via network 4 using various suitable communication techniques. For example, computing systems 6A and 6B may exchange information via wireless and/or wired connections to network 4. Network 4 may include any required hardware for communicatively linking computing systems 6A, 6B, and user device 10. For example, network 4 may include various switches, hubs, routers, and other network equipment that provides for the exchange of information between user device 10 and computing systems 6.

User device 10 represents any type of personal computing device from which a person can view, listen to, feel, or otherwise obtain output based on information received via a network, such as network 4. For example, user device 10 may be a laptop computer, a mobile telephone, phones, a tablet computers, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

User device 10 includes user interface component 20. User interface component 20 of user device 10 may include various technologies for receiving input from, and outputting information to, a user of user device 10. For example, user interface component 20 may include a microphone, a touch screen or other type of presence-sensitive screen, and other types of sensors and input devices for receiving input from a user. User interface component 20 may include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of user device 10.

User interface component 20 may provide a user interface from which a user may interact with user device 10 to cause user device 10 to perform operations relating to functions. For example, user interface component 20 may give a user access to a service, provided by computing system 6B, for receiving content (e.g., social media, television, streaming audio, streaming video, or other types of content) distributed across network 4. Computing system 6B may output media content via network 4 to user device 10. User device 10 may process the media content and output the media content as one or more graphical images, sounds, and haptic-feedback sensations, at user interface component 20.

Computing systems 6 represent any two computing systems, such as one or more desktop computers, laptop computers, mainframes, servers, cloud computing systems, and the like that may maintain different respective user spaces and are capable of exchanging information across a network, such as network 4. For example, computing system 6A may be a back-end merchant system of a store, commercial retailer, or other entity that maintains user space 8A which includes information about users of computing system 6A (e.g., members of a merchant loyalty program). Computing system 6B may be a network content provider that hosts content (e.g., social media streams/webpages, television channels, streaming audio/video services, or other types of content) that computing system 6B distributes via network 4 to users (e.g., subscribers) found in user space 8B. For example, computing system 6B may be an online social networking system that enables users to send, receive, and publish (i.e., post) messages with other users.

Computing system 6A may wish to distribute targeted information to the members from user space 8A that are subscribers to services provided by computing system 6B. For example, computing system 6A may wish to distribute advertisements or product coupons to users of the online social networking system of computing system 6B. As used herein, the term targeted information is used to describe information that may be tailored or customized for a specific user or group of users based on one or more properties, traits, and/or preferences of the user or group. For example, the information may be for a coupon for a product based on the user's previous buying habits, demographic data, etc.

Computing system 6A includes user space 8A and computing system 6B includes user space 8B. User space 8A and user space 8B (collectively "user spaces 8") are collections of information stored in data repositories that include information about the respective users (e.g., people) associated with each of computing systems 6. Information associated with each of user spaces 8 includes respective user identifiers and information affiliated with the user identifiers, such as PII, passwords, and other user information.

In other words, each of user spaces 8 is a collection of user identifiers and related information for a particular domain. In some examples, the domain may define a particular realm of users associated with a particular service. In some examples, the service for a particular domain could be a social networking service, product promotion service, media content service, or any other computing service provided by computing systems 6. For example, computing system 6A may maintain data at user space 8A about the people who belong to a membership program, whereas, computing system 6B may maintain other data at user space 8B about the individual users who subscribe to media services provided by computing system 6A.

User spaces 8 may each be quite large and may each store information pertaining to a seemingly infinite number of users. The information retained by user spaces 8 may include personally identifiable information about each of the users associated with computing systems 6. For example, user spaces 8 may include the names, physical addresses, telephone numbers, e-mail address, birthdates, payment or credit card information, histories, device identifiers, and the like. Computing systems 6 may each encrypt the information stored by user spaces 8 so as to prevent hacking and leaking of the personally identifiable information associated with the users of computing systems 6.

While user spaces 8A and 8B may be similar or share some similar types of information, each of user spaces 8A and 8B may be unique and tailored respectively, for computing system 6A and 6B. Said another way, user space 8A may store some common, and some unique information, about users as compared to user space 8B. User space 8A may store the names, e-mail addresses, birthdates, and phone numbers of the users of computing system 6A, whereas user space 8B may store the names, birthdates, e-mail addresses, and social media handles of the users of computing system 6B.

User spaces 8 may tag or otherwise associate the information stored about each of the different individual users with a unique, user identifier (ID). For example, user space 8A may assign user ID "1215" to a user named "Bob" and may assign user ID "1217" to a user named "Sara". Although user spaces 8 may include information about the same person, the user IDs used by user space 8A may be different and/or may rely on different nomenclature than the user IDs user by user space 8B. For example, even though the user named "Bob" in both user spaces 8A and 8B may correspond to the same actual person, user space 8B may assign user ID "C5D11" to the user named "Bob" and user space 8B may assign user ID "1215" to the user named "Bob". That is, the actual person corresponding to "Bob" may create separate accounts in computing systems 6A and 6B, respectively, but each account may have a different user ID, although other PII may be the same (e.g., first name, last name, phone number, etc.).

Because user spaces 8 may be very large, in some examples storing information pertaining to thousands or millions of different users, and because each of user spaces 8 may reference the same individual people using two different and seemingly irreconcilable user IDs, the reconciliation of user spaces 8A and 8B may, for other systems, be a difficult if not at least complex and time consuming task that would likely require the exchange of at least some personal identifiable information (e.g., name, telephone number, address, and the like) about their respective users. For the reconciliation of two unique, but at least partially overlapping, user spaces, such as user spaces 8, computing system 6B includes mapping module 12.

Mapping module 12 is configured to reconcile the user IDs from the user space of one computing system to the user IDs of another user space (e.g., of another computing system). Although shown for the sake of brevity as being part of computing device 6B, mapping module 12 may be part of computing system 6A. In some examples, mapping module 12 may be part of a stand-alone or third-party system that is accessible from network 4 by computing systems 6A and 6B (e.g., as a service in the cloud), such as further illustrated in FIG. 4.

Mapping module 12 represents any suitable combination of hardware, software, and/or firmware for pairing, matching, or otherwise reconciling the respective user IDs from a first user space with the respective user IDs associated with a second user space. In some examples, mapping module 12 may reconcile the respective user IDs without referencing PII about each of the individual users in the two user spaces. For example, mapping module 12 may generate a mapping (e.g., a table, a set of identifiers/references/pointers, or other suitable data structure) that defines the overlapping and non-overlapping regions or specific user IDs of two different user spaces and the individual pairings of user IDs between two user spaces. For example, mapping module 12 may generate a mapping that includes an entry for the user "Bob" who has user IDs in both user space 8A and 8B. The entry for user Bob may include Bob's user ID "1215" from user space 8A in addition to Bob's user ID "C5D11" from user space 8B. Computing system 6A and/or 6B may reference the mapping generated by mapping module 12 to facilitate communication about the people who have, or who do not have, user IDs in both user spaces 8.

Mapping module 12 may generate the mapping between user spaces by matching hash values based on the identifying information associated with the users of one user space with hash values of the same type of identifying information associated with the users of the other user space. However, rather than using actual personally identifiable information from each user space, mapping module 12 may apply a hash function to the identifying information associated with the users of each user space being mapped and then compare the hash values generated by the hash function to determine which users map from one user space to the other. For example, rather than using actual e-mail addresses associated with the users of user spaces 8A and 8B, mapping module 12 may apply a SHA2-512 hashing algorithm to the e-mail addresses from each of user spaces 8A and 8B before analyzing for matching users. In this way, mapping module 12 may not require actual personally identifiable information that may be common in each of the two user spaces; instead, mapping module 12 merely receives a user ID and corresponding hash value.

In some examples, mapping module 12 may use some benign PII (e.g., a user's home state, home zipcode, home telephone number area code, or other less personalized PII) plus the hash value to map users of to user spaces. For instance, in order to provide an extra layer of accuracy in the mapping, mapping module 12 may match the hashed attributes of two user spaces and also the home states associated with the hashed attributes to produce a mapping from user names of user space 8A to 8B.

Mapping module 12 may match the hashed attributes of one user ID space to the hashed attributes of another user ID space to attain a mapping from one user ID space to another user ID space. In some examples, if some of the hash values of one user ID space are different than the hash values of another user ID space, mapping module 12 may consider these to be unique users that are not shared between the two user ID spaces. For example, mapping module 12 may rely on hashed telephone numbers and match the hashed telephone numbers to determine a mapping between user spaces rather than match the telephone numbers themselves.

In some examples, mapping module 12 may rely on multiple types of hashed attributes to produce a more complicated and in some examples more accurate mapping. For example, mapping module 12 may receive hash values from hash functions that have been applied two or more user attributes, such as Email and telephone. In some examples, mapping module 12 may receive a single hash value for each attribute as a collective input (e.g., single concatenated string). In other examples, mapping module 12 may receive multiple sets of hash values for each user space (e.g., one for each attribute) and match the individual sets of hash values between user spaces.

In operation, mapping module 12 may receive a set of first user identifiers from a first user space and a set of first hash values. The set of first hash values may be generated from a hash function applied to first information that identify users associated with the set of first user identifiers. For example, when computing system 6B wishes to communicate with computing system 6A about the users of user space 8B that are also users of user space 8A, mapping module 12 may request, via network 4, information from computing system 6A for generating a mapping from user space 8A to user space 8B. In particular, mapping module 12 may request a listing of user IDs and hash values from computing system 6A.

In some examples, mapping module 12 may specify via the request, the type of PII that computing system 6A should use in generating the hash values. For instance, mapping module 12 may indicate to computing system 6A the need for user IDs and hash values generated from one or more of telephone numbers, e-mail addresses, and the like. In this way, mapping module 12 can ensure that computing systems 6 provides the necessary information mapping module 12 needs to make the hash value comparisons. In some examples, mapping module 12 may share with computing system 6A a schema or other instructions specifying what particular types of information to use for the hashing. In some examples, computing system 6A may rather than request instructions, include meta data in response to the request that specifies how or with what type of PII the hash values were produced.

In response to the request, computing system 6A may apply a hash function to the e-mail addresses, birthdates, telephone numbers, or some other type of personally identifiable information stored at user space 8A. Computing system 6A may transmit the user IDs from user space 8A along with the corresponding hash values generated from the hash function being applied to the e-mail addresses of user space 8A.

Computing system 6B may apply the same hash function to the same type of personally identifiable information stored at user space 8B that computing system 6A used to generate the hash values received by mapping module 12. Computing system 6B may provide the hash values and user IDs from user space 8B to mapping module 12.

Mapping module 12 may compare the hash values from user space 8A with hash values from user space 8B. Mapping module 12 may determine at least one hash value that is included in both of the set of first hash values from user space 8A and a second set of hash values from user space 8B.

Mapping module 12 may generate a mapping between a first user identifier from the set of first user identifiers and a second user identifier from set of second user identifiers. The first user identifier and the second user identifier each correspond to the at least one hash value. In other words, mapping module 12 may reconcile the two user spaces 8A and 8B such that mapping module 12 can receive as input, a user ID from either user space and provide as output, a corresponding user ID from the other user space. For example, mapping module 12 may maintain a graph, a table, or other data structure that, for each mapping, includes a single user ID from user space 8A and a single user ID from user space 8B. Each mapping may correspond to a row in a table or a branch in a graph, for example. In another example, the first user id and the second user id are each represented as objects at least one of the objects includes a reference or pointer to the other object. And in yet another example, the mapping(s) may be determined on the fly without storing any specific data representing the mapping; that is, mapping module 12 may do real-time comparisons to identify two matching hash values.

With a mapping between user spaces 8A and 8B maintained by mapping module 12, computing system 6A may determine, based on user space 8A, targeted information directed a user with a second user identifier. For example, computing system 6A may determine a coupon, offer, or other advertisement that is tailored specifically for "Bob" who happens to have user ID 1215 in user space 8A. Computing system 6A may share the targeted information with computing system 6B along with an instruction to output the targeted information to user ID 1215 from user space 8A. In some examples, computing system 6B may charge a fee to reconcile user spaces 8A and 8B and/or provide the targeted information, which is also described in further detail in the examples of the additional FIGS.

Computing system 6B may output, based on the mapping, the targeted information to a user device associated with the first user identifier. For example, mapping module 12 may receive user ID 1215 which corresponds to the user ID of "Bob" from user space 8A and output user ID C5D11, the user ID of "Bob" from user space 8B. Computing system 6B may output the targeted information received from computing system 6A to a user device associated with user ID C5D11 which, in this example, happens to be user device 10. For instance, user device 10 may include application which is authenticated or otherwise logged in with user ID C5D11. In this way, user "Bob" who maintains accounts with computing system 6A and 6B can receive information from computing system 6A via a service Bob subscribes to with computing system 6B.

Using the described hashing techniques, a system may map the respective user identifiers of two or more entities to a single, common or shared set of user identifiers that the two entities can each reference, to refer to the same person in each entities user ID space. Each shared user identifier may correspond to a unique individual, irrespective of whether that unique individual is a user from just one or multiple respective user ID spaces. The shared user identifiers may correspond to the user IDs in the user ID space of one entity while in other examples, the shared user identifiers may have different nomenclature that is agreed upon by two or more entities Two or more entities that maintain separate respective user spaces may collaborate and communicate about the users in each respective user space without having to share sensitive personal identifiable information (e.g., name, telephone number, address, and the like) about their respective users. Each system may merely share the hash values generated by applying the same hash function to the same type of PII stored in both user spaces. By comparing the hash values generated from two user spaces, the systems can identify areas of overlap and the individual users that are common to both user spaces.

In this way, two or more entities can refer to the same individual simply by referencing the same unique user identifier from the shared set. Two entities can isolate overlapping regions of their respective user ID spaces by matching that hash values that correspond to a user from both respective user ID spaces. Anonymity of each entity's user ID space may be preserved since the only information shared between two entities may be a hash value and in some examples, a corresponding user identifier. In any case, the personally identifying information used to generate the hash value need not be shared.

As such, even if the two or more computing system are associated with non-technical entities (e.g., retail stores, non-technical service providers, or other entities without institutional knowledge or vast technical resources for solving engineering problems) wish to collaborate, the techniques of this disclosure may enable a computing system to provide the two or more computing systems of the non-technical entities with a way to collaborate and anonymously reconcile their respective user spaces.

Figure 2:
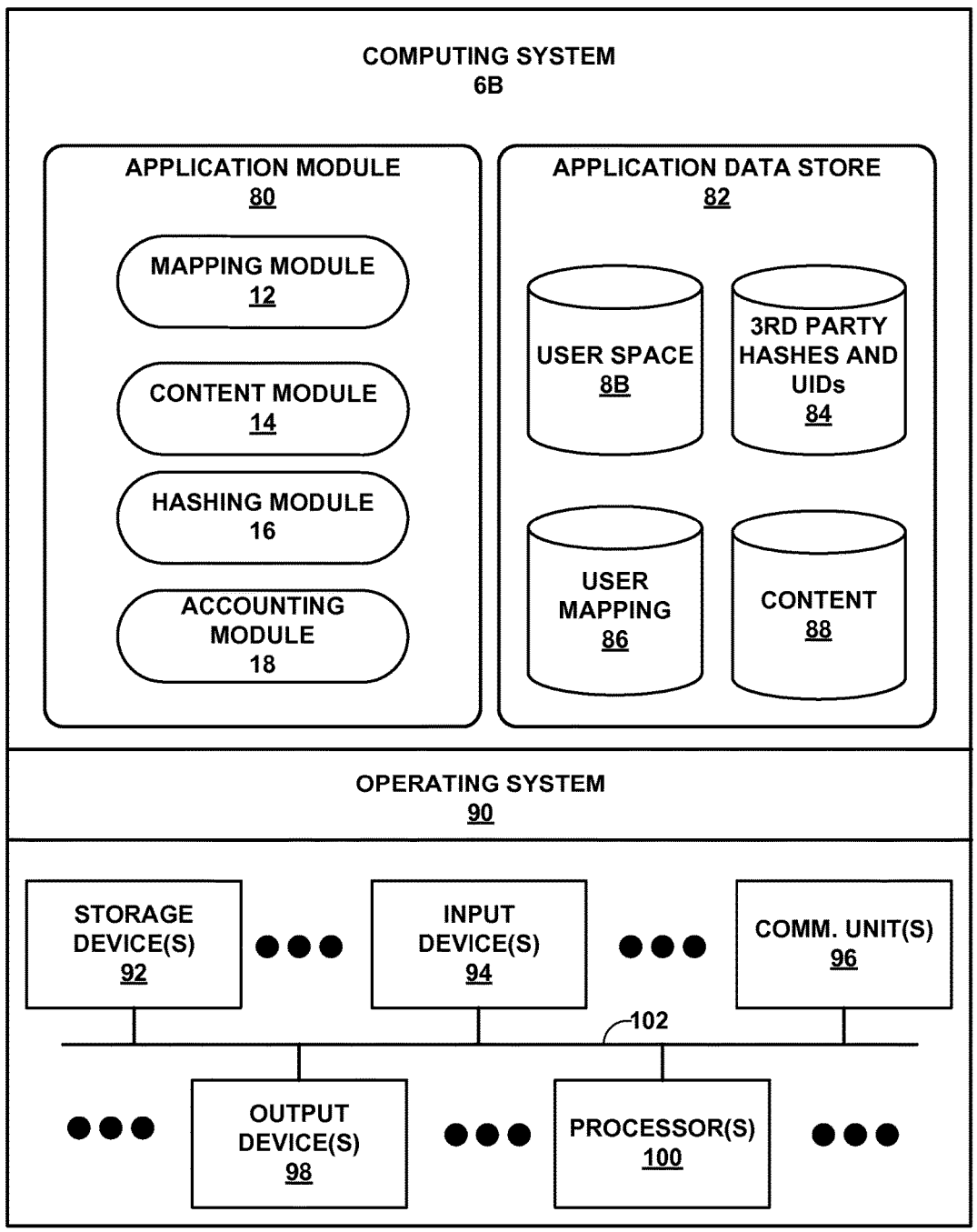
FIG. 2 is a block diagram illustrating an example computing system for reconciling user identifiers from multiple different user spaces, in accordance with one or more aspects of the present disclosure.

FIG. 2 is a block diagram illustrating an example of computing system 6B for reconciling user identifiers from multiple different user spaces, in accordance with one or more aspects of the present disclosure. Computing system 6B of FIG. 2 is described below within the context of FIG. 1. FIG. 2 illustrates only one particular example of computing system 6B, and many other examples of computing system 6B may be used in other instances and may include a subset of the components included in example computing system 6B or may include additional components not shown in FIG. 2. Although computing system 6B is shown as a single computing system in the example of FIG. 2, it should be understood that the capabilities of computing system 6B that are described herein may be performed by multiple computing systems and multiple computing devices. For example, the operations and techniques attributed to computing system 6B may be implemented as a software service, accessible via a cloud or some other network, that is executing on a computing cluster, such as at a remote data center.

As shown in the example of FIG. 2, computing system 6B includes application module 80, application data store 82, operating system 90, one or more storage devices 92, one or more input devices 94, one or more communication units 96, one or more output devices 98, one or more processors 100, and one or more communication channels 102. Application module 80 includes mapping module 12, content module 14, hashing module 16, and accounting module 18. Application data store 82 includes user space 8B, third party hashes and user IDs (TPHIs) 84, user mapping 86, and content 88.

Communication channels 102 may interconnect each of the components 80, 82, 90, 92, 94, 96, 98, and 100 for inter-component communications (physically, communicatively, and/or operatively). In some examples, communication channels 102 may include a system bus, a network connection, an inter-process communication data structure, or any other method for communicating data.

One or more input devices 94 of computing system 6B may receive input and one or more input devices 98 may generate output. Examples of input are tactile, audio, and video input and examples of output are tactile, audio, and video output. In one example, input devices 94 include a presence-sensitive display, touch-sensitive screen, mouse, keyboard, voice responsive system, video camera, microphone, or any other type of device for detecting input from a human or machine. Whereas in one example, output devices 46 include a presence-sensitive display, sound card, video graphics adapter card, speaker, cathode ray tube (CRT) monitor, liquid crystal display (LCD), or any other type of device for generating output to a human or machine.

One or more communication units 96 may allow computing system 6B to communicate, via one or more wired and/or wireless networks, with external devices and/or systems. For example communication units 96 may transmit and/or receive network signals being transmitted and received other devices and/or systems connected to network 4. Examples of communication units 96 include network interface cards (e.g. such as an Ethernet card), optical transceivers, radio frequency transceivers, GPS receivers, or any other type of device that can send and/or receive information via a network. Other examples of communication units 96 may include long and short wave radios, cellular data radios, wireless network radios, as well as universal serial bus (USB) controllers.

One or more storage devices 92 of computing system 6B may store information or instructions that computing system 6B processes during operation of computing system 6B. For example, storage devices 92 may store data (e.g., as application data store 82) that application module 80 may access during execution at computing system 6B. In some examples, storage devices 92 are temporary memories, meaning that a primary purpose of storage devices 92 is not long-term storage.

Storage devices 92 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 92 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 92, in some examples, include one or more computer-readable storage media. In some examples, storage devices 92 represent non-transitory computer readable storage medium that store instructions later executed by one or more processors 100 during operation of computing system 6B. For example, storage devices 92 may store program instructions and/or information (e.g., data) associated with 12, 14, 16, 18, 80 and data stores 8B, 82, 84, 86, and 88.

One or more processors 100 may implement functionality and/or execute instructions within computing system 6B. For example, processors 100 on computing system 6B may receive and execute instructions stored by storage devices 92 that execute the functionality of modules 12, 14, 16, 18, and 80. The instructions executed by processors 100 may cause computing system 6B to read/write/etc. information, such as one or more data files at file application data store 82 and stored within storage devices 92 during program execution. Processors 100 may execute instructions of modules 12, 14, 16, 18, and 80 to cause computing system 6B to perform the operations described herein for reconciling two user spaces. That is, modules 12, 14, 16, 18, and 80 may be operable by processors 100 to perform various actions or functions of computing system 6B, for instance, mapping user space 8B to the user space of another computing system, such as user space 8A of computing system 8A.

Content module 14 may host one or more services that provide content to subscribers or users from user space 8B. For example, content module 14 may be a multimedia content provider, a social media network provider, a television provider, a streaming video or audio provider, or any other form of service provider that provides content to one or more computing devices linked to subscribers via network 4. For example, content module 14 may host a social media network service and provide social media content as one or more pages, streams, and the like to one or more users of user space 8B. Content module 14 may retrieve content from content 88 and output the content as information to one or more computing devices associated with users of user space 8B.

In some examples, content module 14 may host an online social network service that enables users to send, receive, and publish messages for other users on the Internet. In some examples, content module 14 may host a streaming audio and/or video service and provide streaming audio and/or video data to one or more subscribers of user space 8B. In some example, content module 14 may provide content via network 4 that content module 14 receives from other computing devices and/or systems. For example, content module 14 may receive targeted content from computing device 6A and output the targeted content to one or more users of user space 8B.

Hashing module 16 performs hashing techniques on information stored about users in user space 8B using one or more hashing functions or algorithms. For example, hashing module 16 may receive as input, data to be hashed, and provide as output, hash values based on the data.

In some examples, the hashing techniques used by hashing module 16 may be based on the SHA2-512 hashing algorithm. However any hashing algorithm may be used by hashing module 16 so long as the hashing algorithm is irreversible and has a sufficiently large enough hash space to handle a large volume of data with few collisions. For example, hashing module 16 may use SHA2-512 for its sufficiently large hash space that would result in few collisions between a large volume of users that may occupy each user ID space.

Hashing module 16 may access user space 8B and perform hashing techniques on PII associated with the users of user space 8B. For example, mapping module 12 may invoke hashing module 16 to generate hash values based on the telephone numbers, e-mail addresses, or other type of contact information associated with the users of user space 8B.

Accounting module 18 may perform operations for monetizing the services provided by content module 14 on behalf of other computing systems, such as computing system 6A. For example, computing system 6A may provide targeted content to content module 14 for distribution via content module 14 to one or more users of user space 8B. Accounting module 80 may record each transaction associated with the targeted content from computing device 6B by users of user space 8B. Each time one of users of user space 8B views, clicks, purchases, or otherwise interacts with content provided via content module 14, accounting model 80 may record the interaction as a transaction. In some examples, accounting module 18 may further monetize the features of computing system 6B, for instance, by performing mapping services for two different computing systems. For example, accounting moduel 12 may charge a fee when two or more systems request that computing system 6B operate as a third-party to perform the reconciliation process for two or more user spaces.

Accounting module 18 may periodically output an invoice to computing system 6A for each of the recorded transactions. For example, each hour, day, week, month, etc., accounting module 18 may sum the total instances that users of user space 8B have interacted with the targeted content provided by computing system 6A and output a record and invoice of the transitions.

Mapping module 12 may generate a mapping between user space 8B and a user space of another computing system by first determining a common attribute or type of personally identifiable information (PII) found in user space 8B and the other user space (e.g., telephone number attribute, e-mail attribute, etc.). After causing hash module 16 to apply the same hashing algorithm to the common attributes of user space 8B that the other computing system applies to the other user space, mapping module 12 may match the hashed attributes of user space 8B to the hashed attributes of the other user space to attain a mapping from user space 8B to the other user space. In some examples, mapping module 12 may determine that the hash values of user space 8B that are different than the hash values of all the hash values of the other user space are unique users that are not shared between the two user spaces.

Figure 3:
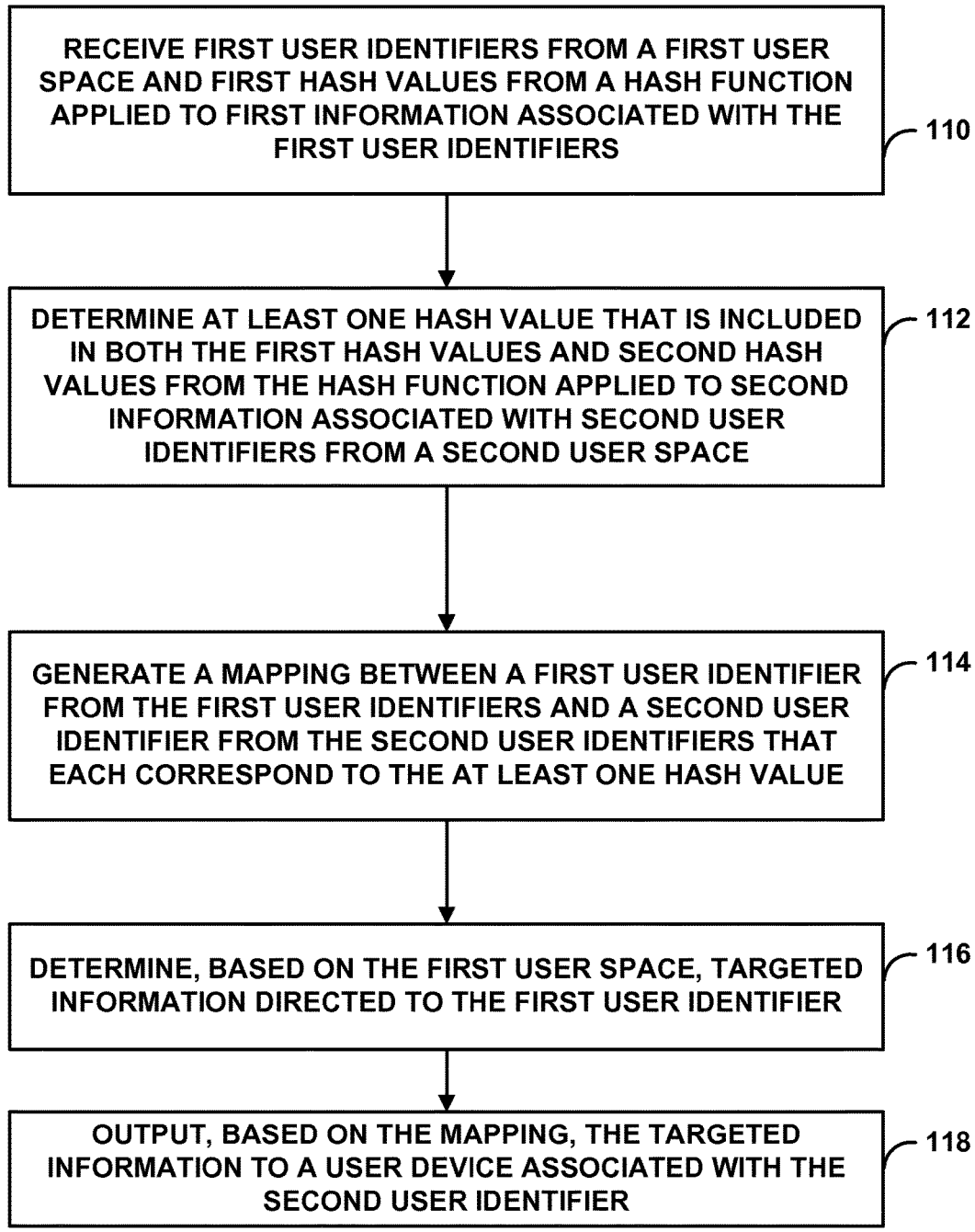
FIG. 3 is a flowchart illustrating example operations performed by an example computing system configured to reconcile user identifiers from multiple different user spaces, in accordance with one or more aspects of the present disclosure.

FIG. 3 is a flowchart illustrating example operations 110-118 performed by computing system 6B which is configured to reconcile user identifiers from multiple different user spaces, in accordance with one or more aspects of the present disclosure. Operations 110-118 are described below as being performed by computing system 6B of FIGS. 1 and 2.

In operation content module 14 may receive a request from computing system 6A to have content module 14 provide targeted content, via network 4, to those from user space 8A who also happen to be users of the one or more services provided by content module 14, from user space 8B. While communicating with computing system 6A, content module 14 may receive a set of first user IDs from user space 8A and a set of first hash values generated from a hash function applied to first information (e.g., e-mail addresses) that identifies users associated with the set of first user IDs (110). For example, content module 14 may receive a list of user IDs and corresponding hash values based on a hash function applied to the e-mail addresses of the users from the list. Mapping module 12 may receive hash values and user IDs associated with user space 8A and store the information as third party hashes and user IDs 84.

Responsive to receiving the list of user IDs, hash values, and targeted content from computing system 6A, content module 14 may call on mapping module 12 to reconcile the set of user IDs for user space 8A with user IDs from user space 8B. Mapping module 12 may call on hashing module 16 to apply the same hash function used by computing system 6A, to the same type of identifying information (e.g., e-mail addresses) associated with user space 8B that computing system 6A applied to user space 8A.

Mapping module 12 may determine at least one hash value that is included in both of the set of first hash values and a second set of hash values that are generated from the hash function being applied to second information that identifies users associated with a set of second user identifiers from a second user space (112). Said differently, after configuring hashing module 16 to perform hashing on the second information, mapping module 12 may compare the hash values received from computing system 6A to those hash values generated by hashing module 16 to determine any hash values that are included in both sets of hash values.

Mapping module 12 may generate a mapping between a first user identifier from the set of first user identifiers and a second user identifier from the set of second user identifiers that each correspond to the at least one hash value (114). In other words, mapping module may generate, and store as a map at user mapping 86, information for translating or otherwise preserving the relationship that a user ID from user space 8A has as compared to a corresponding user ID from user space 8B. For example, for a user named "Bob" who is a user associated with both user spaces 8A and 8B, the map generated by mapping module 12 may receive user ID 1215 from user space 8A as input and generate user ID C5D11 from user space 8B as output. With a mapping between user space 8A and 8B generated and stored at user mapping 84, client module 14 may receive data pertaining to the targeted content computing system 6A wishes to present to users of user space 8B that are also members of user space 8A.

Computing system 6B may determine, based on user space 8A, targeted information directed to the first user identifier (116). For instance, computing system 6A may be a merchant and the targeted content may be for a coupon or commercial for members of the merchant's loyalty program. Computing system 6A may wish to provide a coupon, commercial, or other type of targeted content to a user from user space 8A that uses a social media network service provided by client module 14. Computing system 6A may provide client module 14 with the targeted content that computing system 6A wishes to provide using client module 14.

In order to reconcile the user ID from user space 8A to user space 8B, client module 14 may rely on the user mapping generated by mapping module 12 to determine which user ID from user space 8B corresponds to the user ID from user space 8A. Client module 14 may input the user ID from user space 8A into the mapping generated by mapping module 12 and receive in response, the corresponding user ID from user space 8B.

Computing system 6B may output, based on the mapping, the targeted information to a user device associated with the second user identifier. In other words, client module 14 may provide the targeted content received from computing system 6A that is directed to a user from user space 6A, to computing device 10 which represents a user device the corresponding user from user space 8B. In this way, computing system 6A can output targeted content to computing device 6B along with a list of user IDs from user space 8A, and in response, computing system 6B will output the targeted content to the user devices of the corresponding user IDs from user space 8B.

In some examples, in response to outputting the targeted information to the user device associated with the second user identifier, computing system 6B may output, to computing system 6A, an invoice for outputting the targeted information to the user device associated with the second user identifier. For example, content module 14 may invoke accounting module 18 to record when content module 14 provides targeted content to users of user space 8B. Accounting module 18 may update (e.g., decrement or increment) a transaction count value associated with user space 8A and/or the targeted information each time content module 14 invoke accounting module 18. Periodically (e.g., hourly, daily, weekly, monthly, quarterly, etc.) accounting module 18 may generate an invoice for payment of providing targeted content via the one or more services associated with content module 14. Accounting module 18 may output an indication of the invoice to computing system 6A. In this way, accounting module 18 may enable computing system 6B to monetize the service of reconciling two user spaces and providing targeted content from one user space to users of another user space.

In some examples, content module 14 may receive feedback from user device 10 in response to a user viewing, listening, clicking, or otherwise interacting with the targeted content provided via the one or more services. For example, each time the user of user device 10 views targeted content at user interface component 20, user device 10 may output data indicating as much to computing system 6B. This way, computing system 6B can track whether the targeted content being output to user device 10 is actually being consumed.

In some examples, when computing system 6B outputs targeted content and/or in response to receiving an indication that the user device presented the targeted information, accounting module 18 of computing system 6B may record the instance as a transaction for providing the targeted information to the user device associated with the second user identifier. Over time, accounting module 18 may sum the transactions and invoice computing system 6A for the service of providing content to users of content module 14. For example, accounting module 18 may generate an invoice for a plurality of transactions recorded, by computing system 6A, during a time duration (e.g., month, quarter, week, day, etc.), for providing the targeted information to the user device associated with the second user identifier.

In this way, FIG. 3, in some examples, may describe operations of a merchant (e.g., a commercial entity) computing system working together with a partner computing system for providing media content to users of the merchant and partners' products and services. A merchant (e.g., computing system 6A) may deliver to a partner (e.g., computing system 6B) a list of user IDs in the merchant's user ID space 8A and a respective hash value for each user ID in the list. The partner may perform the same type of hash to the previously agreed type of PII for each of the users in its user ID space 8B. The partner may compare the hashing values derived from the hashing of the partner's user ID space 8B to the hashing values from the merchant space 8A to determine which of the merchant user IDs corresponds to individual users from the partner's user ID space 8A. The partner can communicate with the merchant and the merchant can communicate with the partner, using the merchant's own language (e.g. by referencing the merchant's user ID from the merchant's user ID space 8A). The partner can provide information to the merchant indicative of how individuals in the merchant's user ID space 8A are interacting with the partner's services, and in some examples, if the partner determines that one of the merchant's users is using the partner's service, the partner can provide that user an enhanced user experience.

Figure 4:
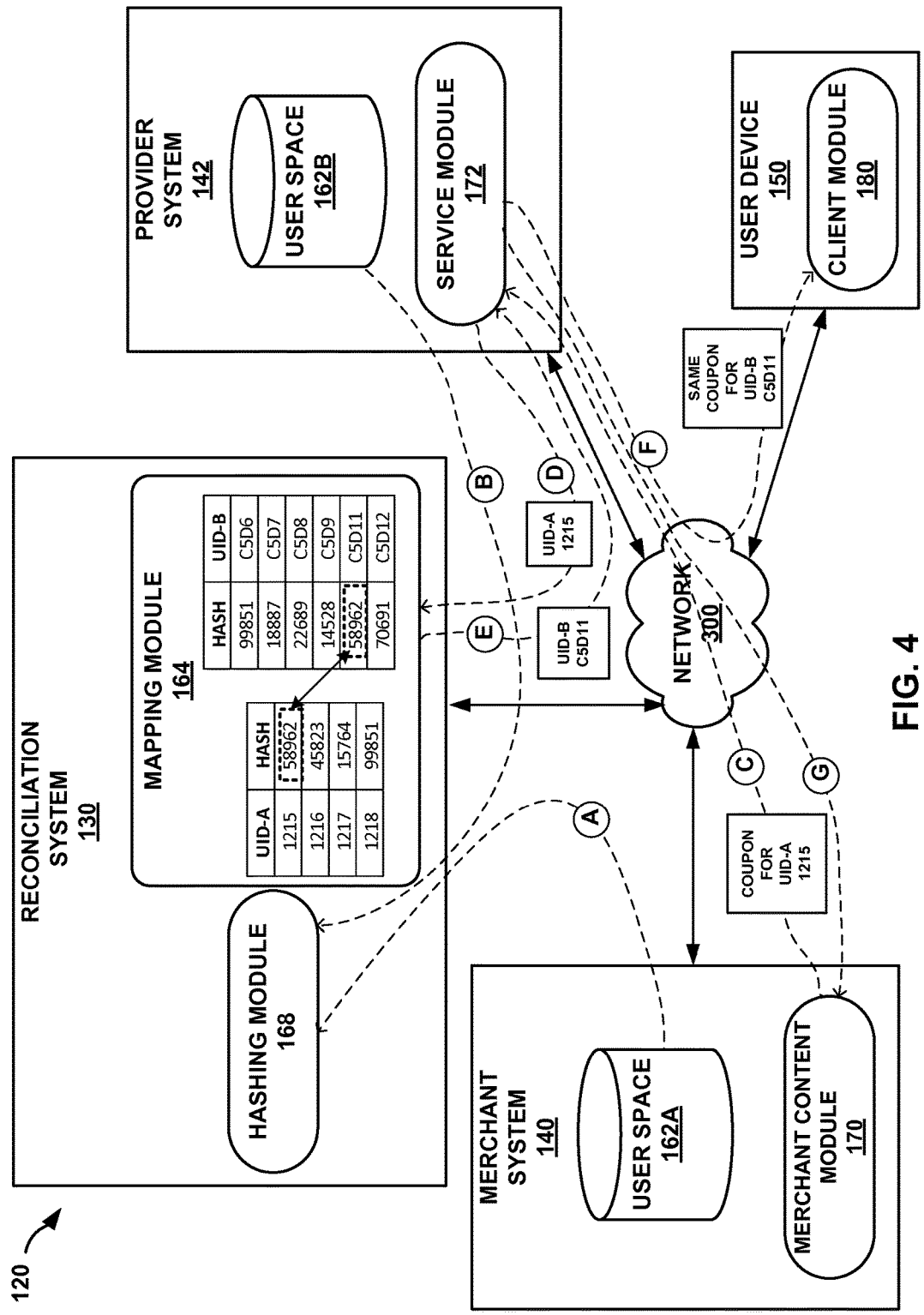
FIG. 4 is a conceptual diagram illustrating an example system which includes an example third party system for reconciling user identifiers from user spaces of two example partner computing systems, in accordance with one or more aspects of the present disclosure.

FIG. 4 is a conceptual diagram illustrating system 120 which includes an example third party system 130 for reconciling user identifiers from user spaces of two example partner computing systems 140 and 142, in accordance with one or more aspects of the present disclosure. System 120 includes reconciliation system 130, provider system 142, merchant system 140, and user device 150, all interconnected via network 300. Reconciliation system 130 may include one or more components as described with respect computing device 6B of FIG. 2.

As an aside, FIG. 4 includes paths "A"-"G" as example data paths that data or signals may take when being transmitted between systems 130, 140, 152, and device 150 via network 30. In some examples, data paths may represent logical flows of information or operations performed by one or more systems. The description of FIGS. 5A and 5B that follows this description of FIG. 4, describes in detail operations 200-228 being performed by systems 130, 140, 152, and device 150 for distributing data through network 30 via paths "A"-"G".

FIG. 4 includes provider system 142. Provider system 142 relies on service module 172 to provide services, such as delivering media content, to users of user space 162B. In the examples that follow, provider system 142 is described as providing a social media network service. However, examples of provider system 142 include any type of computing platform or system that distributes content via a network, such as, but not limited to: social media providers, television providers, video-on-demand service providers, streaming audio providers, or any other provider of multimedia content on a network, such as the Internet.

Merchant system 140 relies on merchant content module 170 to generate merchant content for distribution via one or more network services by users of user space 162A. Examples of merchant system 140 include any type of computing platform or system that generates advertising content, catalog content, rewards type content, or any other type of promotional content intended to entice customers to visit the merchant (e.g., physically or virtually) associated with merchant system 140. For example, merchant system 140 may generate a promotional e-mail advertisement for users of a loyalty program associated with merchant system 140.

User device 150 represents any type of mobile or non-mobile computing platform from which a user of user space 162B can view, hear, or otherwise receive media content via network 300. For example, user device 150 may be a mobile phone or table computer that a user of user device 150 uses to connect to one of the services provided by provider system 142. User device 150 relies on client module 180 to receive information from service module 172 for use in presenting the media content provided by provider system 142.

Reconciliation system 130 is configured to reconcile the respective user spaces of two or more computing systems for enabling cross communication between the two or more computing systems, about the individual users in each respective user space. For instance, reconciliation system 130 may provide a network based or cloud based, application programming interface (API) service for reconciling user spaces between two systems.

As one example, service module 172 of provider system 142 may provide media content to users of user space 162B. Service module 172 may rely on telephone numbers (or some other PII) stored in user space 162B for differentiating between individual users in user space 162B. Merchant content module 170 of merchant system 140 may provide merchant content to users of user space 162A. Merchant content module 170 may also rely on telephone numbers (or some other PII that is the same type of PII used by provider system 142) stored in user space 162A for differentiating between individual users in user space 162A.

To enable communication between provider system 142 and merchant system 140, systems 140 and 142 may call on an API provided by reconciliation system 130 to reconcile user spaces 162A and 162B. Reconciliation system 130 may obtain, via the API, a list of user IDs associated with user space 162A and corresponding telephone numbers from merchant system 140 and may further obtain, via the API, a list of user IDs associated with user space 162B and corresponding telephone numbers from the provider system 142 via the API.

Hashing module 168 of reconciliation system 130 may hash the telephone numbers from systems 140 and 142.

Based on the hash of telephone numbers associated with user spaces 162A and 162B, mapping module 164 may generate a mapping between the user IDs associated with user space 162A and the user IDs associated with user space 162B. Mapping module 164 of reconciliation system 130 may provide the mapping, or continued cloud-based access to the mapping, to systems 140 and 142 such that either system may provide a user ID from either user space 162A or 162B as input into reconciliation system 130 and receive as output, a corresponding user ID from the other user space 162A or 162B. Accordingly, provider system 142 and merchant system 140 need not reconcile the user IDs of user spaces 162A and 162B, rather, systems 140 and 142 can simply rely on reconciliation system 130 to reconcile the two user spaces 162A and 162B automatically for enabling systems 140 and 142 to communicate in the same user ID space, and without having to share any PII or use user IDs at all to determine which users in their respective user spaces refer to the same people. As a result reconciliation system 130 may serve as a secure intermediary for performing reconciliation of two unique user spaces.

Figure 5A:
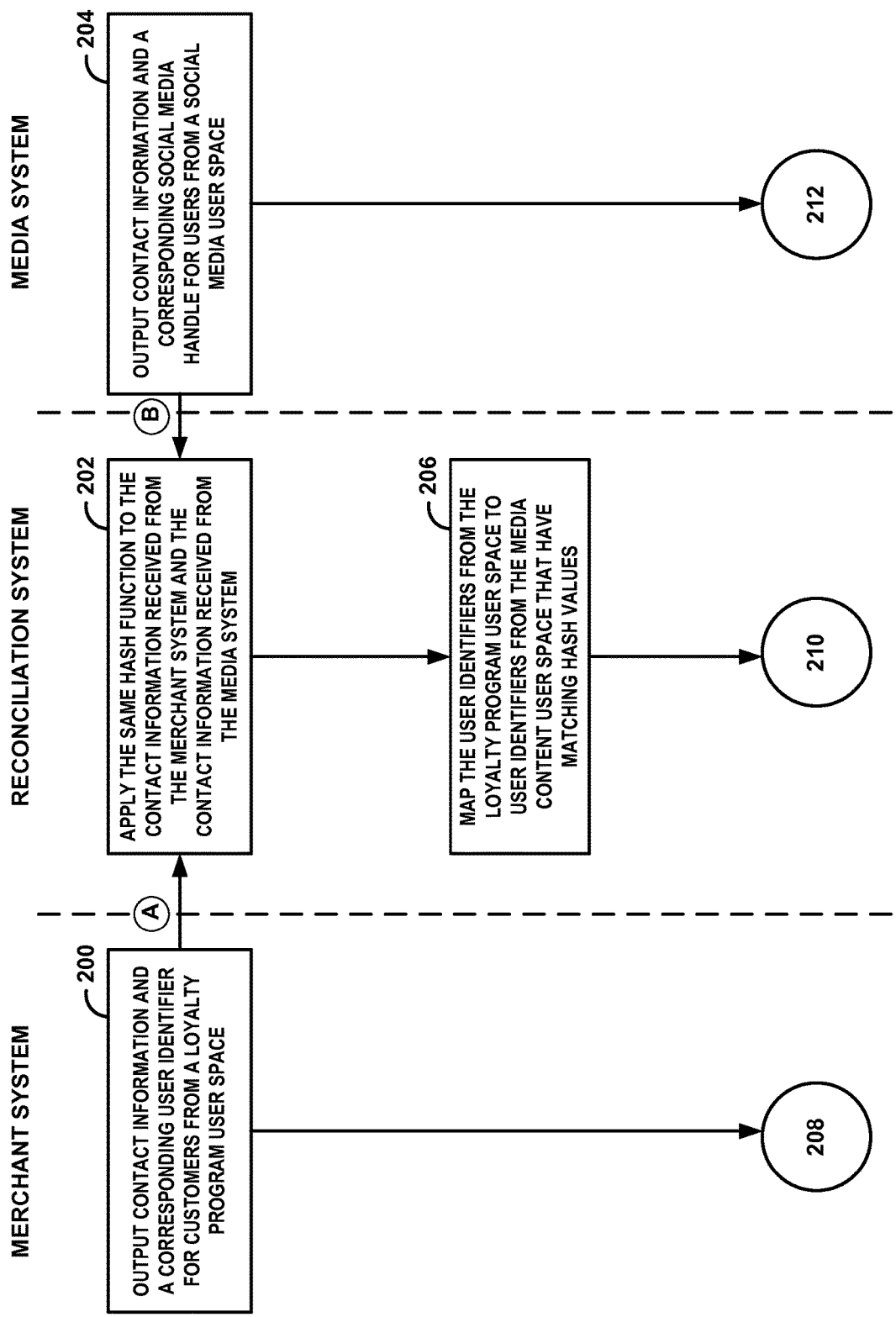
FIGS. 5A and 5B are flowcharts illustrating example operations performed by two example partner computing systems and an example third party system for reconciling user identifiers from user spaces of the two example partner computing systems, in accordance with one or more aspects of the present disclosure.
Figure 5B:
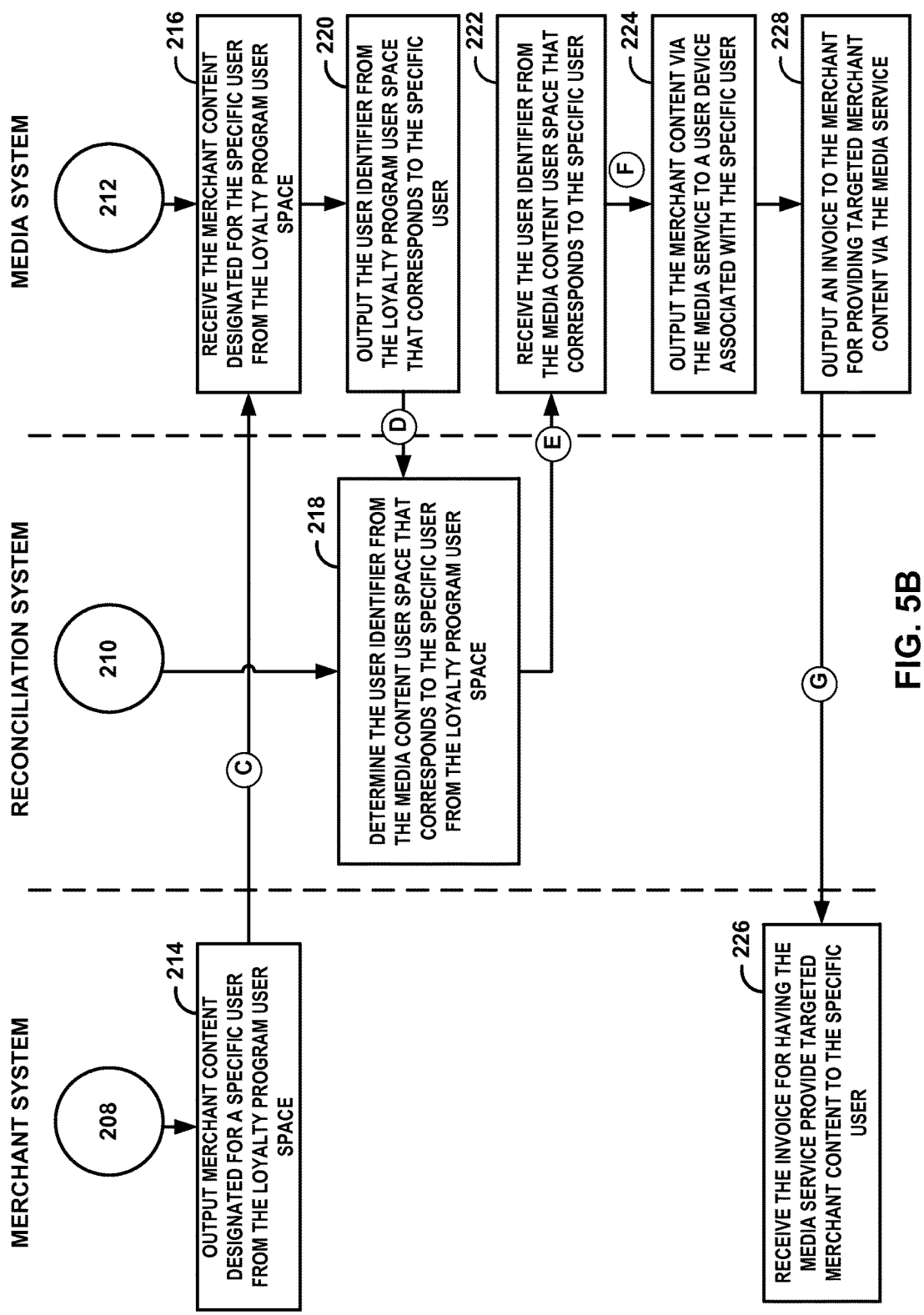

FIGS. 5A and 5B are flowcharts illustrating example operations 200-228 performed by two example partner computing systems 140 and 142 and an example third party system 130 for reconciling user identifiers from user spaces 162A and 162B of the two example partner computing systems 140 and 142, in accordance with one or more aspects of the present disclosure. FIGS. 5A and 5B are described below within the context of system 120 of FIG. 4.

Merchant system 140 may distribute "product level" discounts (e.g., "coupons") or advertisements via services provided by provider system 142. With these discounts or coupons, merchant system 140 may target users of user space 162A who are also users of the services provided by provider system 142 (i.e., the so-called users of user space 162B). In some examples, merchant system 140 may attract new users or new customers and target users of the services provided by provider system 142 (i.e., the so-called users of user space 162B) who are not already users of user space 162A. In this way, merchant system 140 may perform "Ad targeting" using the media services of provider system 142. For example, merchant system 140 can target people in user space 162B who are members of user space 162A with one type of coupon (e.g., ad "A"), and can target people in user space 162B who are NOT members of user space 162A with a different coupon (e.g., ad "B").

FIG. 5A shows that in operation, merchant system 140 may output contact information and a corresponding user identifier for customers from a loyalty program user space (200). For example, merchant system 140 may output data that travels path "A" via network 300 to reconciliation system 130. The data traveling via path "A" may include an indication of telephone numbers and corresponding user IDs from user space 162A. In addition, provider system 142 may output contact information and a corresponding social media handle (or identifier) for users from a social media user space (204). For example, provider system 142 may output data that travels path "B" via network 300 to reconciliation system 130. The data traveling via path "B" may include an indication of telephone numbers and social media network handles that correspond to user IDs from user space 162B.

Reconciliation system 130 may receive the contact information and corresponding user IDs from merchant system 140 and provider system 142. In operation, hashing module 168 of reconciliation system 130 may apply the same hash function to the contact information received from merchant system 140 and the contact information received from provider system 142 (202). For example, as reconciliation system 130 receives data via path "A", hashing module 168 may apply a hashing function based on the SHA2-512 hashing algorithm to the telephone numbers from user space 162A. In addition, hashing module 168 may apply the same hashing function based on the SHA2-512 hashing algorithm to the telephone numbers from user space 162B.

Reconciliation system 130 may map the user IDs from the loyalty program user space to user identifiers from the media content user space that have matching hash values (206). For example, mapping module 164 may receive hash values as output from hashing module 168 after hashing module 168 applies the same hash function to the telephone numbers of user space 162A and 162B. Mapping module 164 may develop a map between user space 162A and 162B by pairing the user IDs from user space 162A with social media handles for users from user space 162B that share the same hash values. In this way, the map may provide a one-to-one correspondence between people who have a user ID from user space 162A and a social media handle from user space 162B.

With a map between user spaces 162A and 162B in place, merchant system 140 may output merchant content designated for a specific user from the loyalty program user interface (214). For example, as shown in FIG. 4, merchant content module 170 may communicate with service module 172 directly via data path "C". Merchant content module 170 may provide data to service module 172 that includes information or instructions for providing a coupon to a user from user space 162A that has a user ID in user space 162A of "1215".

Service module 172 may receive the merchant content designated for the specific user from the loyalty program user space (216). For example, service module 172 may receive, via data path "C", the information or instructions being transmitted by merchant system 140 for providing the coupon to the user from user space 162A that has the user ID in user space 162A of "1215".

Service module 172 may output the user identifier from the loyalty program user space that corresponds to the specific user (220) to reconciliation system 130. Service module 172 may rely on reconciliation system 130 to determine the social media handle or user ID from user space 162B that corresponds to the user ID "1215" from user space 162A. Service module 172 may output data or signals via data path "D" that indicates a query for reconciliation system 130 to translate the user ID "1215" from user space 162A into a social media handle or user ID from user space 162B.

Reconciliation system 130 may receive the query from service module 172 and determine, based on the query, the user identifier from the media content user space that corresponds to the specific user from the loyalty program user space (218). For example, mapping module 164 may perform a look up of user ID "1215" in the map that mapping module generated for reconciling user space 162A to 162B. Based on the mapping, mapping module 164 may determine that the user ID "C5D11" from user space 162B has the same hash value as user ID "1215" from user space 162A. Responsive to determining that user ID "C5D11" is a match, mapping module 164 may output, via data path "E", to provider system 142, data or signals as an indication of the matching user identifier from user space 162B.

Provider system 142 may output the merchant content via the media service to a user device associated with the specific user (224). In other words, after relying on reconciliation system 130 to reconcile user ID 1215 into a user ID from user space 162B, service module 172 may determine a device associated with user ID "C5D11" that receives the services provided by service module 172. To fulfill the request from merchant system 140 for relaying the merchant content designated for the specific user from the loyalty program user space, via a service provided by provider system 142 that is being utilized by the specific user, provider system 142 may output the coupon or targeted ad via data path "F" to client module 180 of user device 150 which maintains an account or login associated with user ID "C5D11". Once received by user device 150, client module 180 may output the merchant content (e.g., for display).

In some examples, responsive to outputting the indication of the user identifier, provider system 142 may receive, from reconciliation system 130, information indicating that the user identifier from user space 162A does not map to any user identifiers that identify the particular user in the user space 162B, and output, to user device 150 an indication of different merchant content (e.g., second targeted contend) designated for general users from the user space 162B that do not map to any users from user space 162A. In other words, merchant system 140 may provide provider system 142 with backup merchant content (i.e., second targeted content) that provider system 142 may provide to users of user space 162B that reconciliation system 130 deems to appear not to have an account or user ID from user space 162A.

In some examples, merchant system 140 and provider system 142 may additionally perform "conversion tracking" techniques and provide feedback to one another about whether the user associated with user device 150 actually "redeemed the offer". For instance, in the case where the user views the coupon presented at user device 150, merchant system 140 may receive an indication from provider system 142 that the person has accepted the offer presented via the media service provided by provider system 142. In some examples, the provider system 142 may require the user to "click" or otherwise provide an affirmation at an input device of user device 150 that the person accepted the offer.

In response to receiving the indication that the person accepted the offer, merchant system 140 may add the offer or coupon to an account associated with the user (e.g., at user space 162A). By applying the coupon to the user's account in response to receiving an indication that the offer or coupon was received at user device 150, merchant system 140 may automatically apply the offer or coupon to the person's next purchase during the next transaction at the merchant's online or physical store.

Subsequent to the transaction or some other later time, merchant system 140 may communicate with provider system 142, further information indicating which users from user space 162A used the coupons that provider system 142 presented via service module 172. With the feedback, provider system 142 may update a user interface associated with the service provided to the user to show coupons that were redeemed (e.g., by removing the coupon from the user interface) and/or by providing a message that congratulates the person and asks for direct feedback (e.g., want another offer, what did you think, etc.).

In any case, provider system 142 may monetize the outputting of merchant content via service module 172. For example, an accounting module of provider system 142 may increment a count, debit a fee to the merchant account, or otherwise generate an invoice for providing targeted merchant content via the media service. Provider system 142 may output an invoice to the merchant for providing targeted merchant content via the media service (228). That is, via data path "G", provider system 142 may output data indicating a quantity of coupons, offers, or redemptions of merchant content, that provider system 142 recorded during a time duration (e.g., one day, one month, etc.). For example, provider system 142 may determine a monetary fee for providing the targeted content from merchant system 140 to user device 150 and output (via data path "G"), to merchant system 140, an indication of the monetary fee.

In some examples, provider system 142 may receive, from user device 150, an indication of user interaction with the targeted content at user device 150, and output (e.g., via data path "G"), to merchant system 140, an indication of a monetary fee for the user interaction with the targeted content at the user device. For example, provider system 142 may track clicks, views, or other actions by a user of user device 150 associated with the merchant content, record the user actions, and invoice merchant system 140 for the user interactions.

In any case, merchant system 140 may receive the invoice for having the media service provide targeted merchant content to the specific user (226). In response to receiving the invoice, merchant system 140 may provide payment to provider system 142.

In some examples, merchant system 140 and provider system 142 may agree to provide a further level of service to the users of user space 162A and 162B. For instance, as an example of more complex user interaction with a coupon or other merchant content being presented by provider system 142 at user device 150, merchant system 140 and provider system 142 may track whether the user of user device 150 interacts with merchant content presented at user device 150.

For example, if merchant system 140 is associated with a loyalty application that can be downloaded and executed from user device 150, and if provider system 142 determines the loyalty app is not installed or enabled on user device 150, provider system 142 may cause client module 180 to request permission from the user to download and install the application. If the loyalty app is installed, client module 180 may create "a deep link" to the merchant content and the loyalty app or otherwise apply the merchant content to the user's electronic loyalty card stored on user device 150.

If provider system 142 determines the user of device 150 is not a member of user space 162A, provider system 142 may configure client module 180 to direct the user to a more involved user interaction (e.g., prompt the user to provide a different e-mail, phone number, etc. such that provider system 142 may attempt to determine whether the user is already in the user space 162A but with different PII).

In some examples, provider system 142 may enable other computing systems to rely on user space 162B. In other words, third party developers may contract with provider system 142 to utilize user space 162B and provide services to the users of user space 162B. In the same way that merchant system 140 provides merchant content to provider system 142 for consumption via services provided by provider system 142, merchant system 140 may rely on reconciliation system 130 and the described techniques to provide merchant content to any third party system or service that uses user space 162B.

Although the described techniques may apply to merchants and media services, any partnership between two entities that need to reconcile different user spaces may benefit from the described techniques. For instance, two merchants or even two media providers may reconcile their respective user spaces using reconciliation system 130 and the described techniques. In some examples, more than two systems may reconcile their respective user spaces using reconciliation system 130 and the described techniques. As such, the described techniques enable reconciliation of user spaces without the sharing of PII between computing devices and/or without having to perform complex and time consuming operations.

Clause 1. A method comprising: receiving, by a computing system, a set of first user identifiers from a first user space and a first set of hash values, wherein the first set of hash values are generated from a hash function applied to first information that identify users associated with the set of first user identifiers; determining, by the computer system, at least one hash value that is included in both of the first set of hash values and a second set of hash values, wherein the second set of hash values are generated from the hash function being applied to second information that identify users associated with a set of second user identifiers from a second user space; generating, by the computing system, a mapping between a first user identifier from the set of first user identifiers and a second user identifier from set of second user identifiers, wherein the first user identifier and the second user identifier each correspond to the at least one hash value; and determining, by the computing system, based on the first user space, targeted information directed to the first user identifier; and outputting, by the computing system, based on the mapping, the targeted information to a user device associated with the second user identifier.

Clause 2. The method of clause 1, further comprising at least one of: applying, by the computing system, the hash function to the first information for generating the first set of hash values; or applying, by the computing system, the hash function to the second information for generating the set of second hash values.

Clause 3. The method of any of clauses 1-2, wherein the first and second information each comprise a same type of information.

Clause 4. The method of any of clauses 1-3, wherein the first user space is associated with a merchant loyalty program, the second user space is associated with a social media network service, and the targeted information comprises an offer for a product or service associated with the merchant loyalty program, the method further comprising: receiving, by the computing system, and from the user device, an indication of a selection of the offer while the offer is presented at the user device; responsive to receiving the indication of the selection, sending, by the computing system, to a merchant system associated with the first user space, based on the selection, an indication of the first user identifier of the first user space for triggering the merchant system to apply the offer to future transactions by the first user identifier; receiving, by the computing system, from the merchant system, an indication that the offer was redeemed by the first user identifier in a transaction; and responsive to receiving the indication that the offer was redeemed by the first user identifier in a transaction, performing, by the computing system, at least one operation in the second user space.

Clause 5. The method of clause 4, wherein the at least one operation includes outputting information via the user device an acknowledgment of the redemption.

Clause 6. The method of any of clauses 1-5, wherein the computing system is a second computing system, the second user space is associated with the second computing system, the first user space is associated with a first computing system, and determining the targeted information comprises receiving, by the second computing system, from the first computing system, an indication of the targeted information, the method further comprising: after outputting the targeted information to the user device associated with the second user identifier, sending, by the second computing system, to the first computing system, an invoice for providing the targeted information to the user device associated with the second user identifier.

Clause 7. The method of any of clauses 1-6, further comprising: responsive to outputting the targeted information, storing, by the computing system, a transaction for providing the targeted information to the user device associated with the second user identifier.

Clause 8. The method of clause 7, further comprising: generating, by the computing system, an invoice for a plurality of transactions recorded, by the computing system, during a time duration, for providing the targeted information to the user device associated with the second user identifier.

Clause 9. The method of any of clauses 1-8, further comprising: after outputting the targeted information to the user device associated with the second user identifier, receiving, by the computing system, from the user device, an indication that the user device presented the targeted information; and updating, by the computing system, a transaction count value associated with the targeted information in response to receiving the indication that the user device presented the targeted information.

Clause 10. A computing system comprising: at least one processor; and at least one module operable by the at least one processor to: receive a set of first user identifiers from a first user space and a first set of hash values, wherein the first set of hash values are generated from a hash function applied to first information that identify users associated with the set of first user identifiers; determine at least one hash value that is included in both of the first set of hash values and a second set of hash values, wherein the second set of hash values are generated from the hash function being applied to second information that identify users associated with a set of second user identifiers from a second user space; generate a mapping between a first user identifier from the set of first user identifiers and a second user identifier from set of second user identifiers, wherein the first user identifier and the second user identifier each correspond to the at least one hash value; and determine, based on the first user space, targeted information directed to the first user identifier; and output, based on the mapping, the targeted information to a user device associated with the second user identifier.

Clause 11. The computing system of clause 10, wherein the computing system is a reconciliation system and the at least one module is further operable by the at least one processor to: receive the set of first user identifiers and the first information from a first computing system; and apply the hash function to the first information for generating the first set of hash values.

Clause 12. The computing system of clause 11, wherein the at least one module is further operable by the at least one processor to: receive the set of second user identifiers and the second information from a second computing system; and apply the hash function to the second information for generating the second set of hash values.

Clause 13. The computing system of any of clauses 10-12, wherein the first user space is associated with a merchant loyalty program and the second user space is associated with a social media network service.

Clause 14. The computing system of any of clauses 10-13, wherein the first and second information each comprise a same type of information and the same type of information comprises at least one of: e-mail addresses of users from the first and second user spaces; telephone numbers of users from the first and second user spaces; mailing addresses of users from the first and second user spaces; or birthdates of users from the first and second user spaces.

Clause 15. A method comprising: receiving, by a reconciliation system, from a first computing system, a set of first user identifiers from a first user space and first information from the first user space that is associated with the set of first user identifiers; receiving, by the reconciliation system, from a second computing system, a set of second user identifiers from a second user space and second information from the second user space that is associated with the set of second user identifiers; determining, by the reconciliation system, a first set of hash values associated with the set of first user identifiers by applying a hash function to the first information from the first user space; determining, by the reconciliation system, a second set of hash values associated with the set of second user identifiers by applying the hash function to the second information from the second user space; generating, by the reconciliation system, based on the first set of hash values and the second set of hash values, a mapping between the set of first user identifiers from the first user space to the set of second user identifiers from the second user space that share matching hash values; receiving, by the reconciliation system, from the second computing system, a query of a particular user identifier from the set of first user identifiers; determining, by the reconciliation system, based on the mapping, a particular second user identifier from the set of second user identifiers that maps to the particular first user identifier; and outputting, by the reconciliation system, to the second computing system, an indication of the particular second user identifier.

Clause 16. A computer-readable storage medium comprising instructions that, when executed, configure one or more processors of a first computing system to: receive, from a second computing system, targeted content designated for a particular user from a second user space of the second computing system; output, to a reconciliation system, an indication of a second user identifier that identifies the particular user in the second user space; responsive to outputting the indication of the user identifier, receive, from the reconciliation system, an indication of a first user identifier that identifies the particular user in a first user space of the first computing system; and output, to a user device associated with the first user identifier, an indication of the target content designated for the particular user.

Clause 17. The computer-readable storage medium of clause 16, comprising further instructions that, when executed, configure the one or more processors of the first computing system to: receive, from the second computing system, the indication of the second user identifier that identifies the particular user in the second user space, wherein the second user identifier comprises a hash value derived from a hash function applied to contact information associated with the particular user.

Clause 18. The computer-readable storage medium of any of clauses 16-17, comprising further instructions that, when executed, configure the one or more processors of the first computing system to: determine a monetary fee for providing the targeted content from the second computing system to the user device associated with the first user identifier; and output, to the second computing system, an indication of the monetary fee.

Clause 19. The computer-readable storage medium of any of clauses 16-18, comprising further instructions that, when executed, configure the one or more processors of the first computing system to: receive, from the user device, an indication of user interaction with the targeted content at the user device; and output, to the second computing system, an indication of a monetary fee for the user interaction with the targeted content at the user device.

Clause 20. The computer-readable storage medium of any of clauses 16-19, wherein the targeted content is first targeted content, the computer-readable storage medium comprising further instructions that, when executed, configure the one or more processors of the first computing system to: responsive to outputting the indication of the user identifier, receive, from the reconciliation system, information indicating that the second user identifier does not map to any user identifiers that identify the particular user in the first user space; and output, to a user device associated with the first user identifier, an indication of second target content designated for general users from the first user space that do not map to any users from the second user space.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   determining, by a computing system, one or more personally identifiable information (PII) types that overlap between a first user space and a second user space, wherein the first user space is associated with a media service and the second user space is associated with a social networking system, and wherein the one or more PII types that overlap between the first user space and the second user space represent one or more categories of information that are common to both the first user space and the second user space;
   receiving, by the computing system, a set of first user identifiers from the first user space and a first set of hash values, wherein the first set of hash values are generated from a hash function applied to first information that identifies users associated with the set of first user identifiers according to the PII types;
   applying, by the computing system, the hash function to identify at least one hash value that is included in both of the first set of hash values and a second set of hash values, wherein the second set of hash values are generated from the hash function being applied to second information that identifies users associated with a set of second user identifiers from the second user space according to the PII types;
   selecting, by the computing system, one or more other identifiable information types that overlap between the first user space and the second user space, the one or more other identifiable information types representing less personalized information types than the PII types;
   generating, by the computing system, a mapping between the first user space and the second user space based on (i) a common hash value corresponding to both of a first user identifier from the set of first user identifiers and a second user identifier from the set of second user identifiers, and (ii) a portion of the other identifiable information that corresponds to both of the first user identifier and the second user identifier;
   determining, by the computing system, based on the first user space, targeted information directed to the first user identifier; and
   outputting, by the computing system, based on the mapping, the targeted information to a user device associated with the second user identifier to target the second user identifier from the second user space while maintaining anonymity of the second user identifier with respect to the first user space.

2. The method of claim 1, further comprising performing one of:
   applying, by the computing system, the hash function to the first information for generating the first set of hash values; or
   applying, by the computing system, the hash function to the second information for generating the second set of hash values.

3. The method of claim 1, wherein the first and second information each comprise a same type of information.

4. The method of claim 1, wherein the first user space is associated with a merchant loyalty program, wherein the second user space is associated with a social media network service, and wherein the targeted information comprises an offer for a product or service associated with the merchant loyalty program, the method further comprising:
   receiving, by the computing system, from the user device, an indication that the offer was selected while the offer was presented at the user device;
   responsive to receiving the indication from the user device, sending, by the computing system and to a merchant system associated with the first user space, an indication of the first user identifier of the first user space for triggering the merchant system to apply the offer to future transactions associated with the first user identifier;
   receiving, by the computing system, from the merchant system, an indication that the offer was redeemed in a transaction associated with the first user identifier; and
   responsive to receiving the indication that the offer was redeemed in the transaction associated with the first user identifier, performing, by the computing system, at least one operation in the second user space.

5. The method of claim 4, wherein the at least one operation includes outputting, by the computing system, information via the user device, the information representing an acknowledgment of the redemption.

6. The method of claim 1, wherein the computing system is a second computing system, wherein the second user space is associated with the second computing system, wherein the first user space is associated with a first computing system, and wherein determining the targeted information comprises receiving, by the second computing system, from the first computing system, an indication of the targeted information, the method further comprising:
   after outputting the targeted information to the user device associated with the second user identifier, sending, by the second computing system and to the first computing system, an invoice for providing the targeted information to the user device associated with the second user identifier.

7. The method of claim 1, further comprising:
   responsive to outputting the targeted information, storing, by the computing system, a transaction for providing the targeted information to the user device associated with the second user identifier.

8. The method of claim 7, wherein the targeted information to the user device associated with the second user identifier is a first transaction, the method further comprising:
generating, by the computing system, a single invoice for a plurality of transactions recorded during a time duration, the plurality of transactions including the first transaction.

9. The method of claim 1, further comprising:
after outputting the targeted information to the user device associated with the second user identifier, receiving, by the computing system and from the user device, an indication that the user device presented the targeted information; and
updating, by the computing system, a transaction count value associated with the targeted information in response to receiving the indication that the user device presented the targeted information.

10. A computing system comprising:
at least one computer processor; and
a memory configured to store instructions executable by the at least one computer processor to:
determine one or more personally identifiable information (PII) types that overlap between a first user space and a second user space, wherein the first user space is associated with a media service and the second user space is associated with a social networking system, and wherein the one or more PII types that overlap between the first user space and the second user space represent one or more categories of information that are common to both the first user space and the second user space;
receive a set of first user identifiers from the first user space and a first set of hash values, wherein the first set of hash values are generated from a hash function applied to first information that identifies users associated with the set of first user identifiers according to the PII types;
apply the hash function to identify at least one hash value that is included in both of the first set of hash values and a second set of hash values, wherein the second set of hash values are generated from the hash function being applied to second information that identifies users associated with a set of second user identifiers from a second user space according to the PII types;
select one or more other identifiable information types that overlap between the first user space and the second user space, the one or more other identifiable information types representing less personalized information types than the PII types;
generate a mapping between the first user space and the second user space based on (i) a common hash value corresponding to both of a first user identifier from the set of first user identifiers and a second user identifier from the set of second user identifiers, and (ii) a portion of the other identifiable information that corresponds to both of the first user identifier and the second user identifier;
determine, based on the first user space, targeted information directed to the first user identifier; and
output, based on the mapping, the targeted information to a user device associated with the second user identifier to target the second user identifier from the second user space while maintaining anonymity of the second user identifier with respect to the first user space.

11. The computing system of claim 10, wherein the memory is further configured to store instructions that are executable by the at least one computer processor to:
receive the set of first user identifiers and the first information from a first computing system; and
apply the hash function to the first information for generating the first set of hash values.

12. The computing system of claim 11, wherein the memory is further configured to store instructions that are executable by the at least one computer processor to:
receive the set of second user identifiers and the second information from a second computing system; and
apply the hash function to the second information for generating the second set of hash values.

13. The computing system of claim 10, wherein the first user space is associated with a merchant loyalty program and the second user space is associated with a social media network service.

14. The computing system of claim 10, wherein the one or more other identifiable information types comprise at least one of:
a home state;
a home zipcode; or
an area code of a home telephone number.

15. A method comprising:
determining, by a reconciliation system comprising one or more processors, one or more personally identifiable information (PII) types that overlap between a first user space and a second user space, wherein the first user space is associated with a media service and the second user space is associated with a social networking system, and wherein the one or more PII types that overlap between the first user space and the second user space represent one or more categories of information that are common to both the first user space and the second user space;
receiving, by the reconciliation system, from a first computing system, a set of first user identifiers associated with the first user space and first information from the first user space that is associated with the set of first user identifiers according to the PII types;
receiving, by the reconciliation system, from a second computing system, a set of second user identifiers associated with the second user space and second information from the second user space that is associated with the set of second user identifiers according to the PII types;
determining, by the reconciliation system, a first set of hash values associated with the set of first user identifiers by applying a hash function to the first information from the first user space according to the PII types;
determining, by the reconciliation system, a second set of hash values associated with the set of second user identifiers by applying the hash function to the second information from the second user space according to the specified other identifiable information types;
selecting, by the reconciliation system, one or more other identifiable information types that overlap between the first user space and the second user space, the one or more other identifiable information types representing less personalized information types than the PII types;
generating, by the reconciliation system, based on the first set of hash values and the second set of hash values, a mapping between the first user space and the second user space based on (i) a matching hash value corresponding to both of the set of first user identifiers from the first user space to the set of second user identifiers from the second user space and (ii) a portion of the other identifiable information that corresponds to both of the first user identifier and the second user identifier;

receiving, by the reconciliation system, from the second computing system, a query of a particular user identifier from the set of first user identifiers;

determining, by the reconciliation system, based on the mapping, a particular second user identifier from the set of second user identifiers that maps to the particular first user identifier; and outputting, by the reconciliation system, to the second computing system, an indication of the particular second user identifier to target the second user identifier from the second user space while maintaining anonymity of the particular second user identifier with respect to the first user space.

16. A non-transitory computer-readable storage medium encoded with instructions that, when executed, cause one or more processors of a computing system to:

determine one or more personally identifiable information (PII) types that overlap between a first user space and a second user space, wherein the first user space is associated with a media service and the second user space is associated with a social networking system, and wherein the one or more PII types that overlap between the first user space and the second user space represent one or more categories of information that are common to both the first user space and the second user space;

receive a set of first user identifiers from the first user space and a first set of hash values, wherein the first set of hash values are generated from a hash function applied to first information that identifies users associated with the set of first user identifiers according to the PII types;

apply the hash function to identify at least one hash value that is included in both of the first set of hash values and a second set of hash values, wherein the second set of hash values are generated from the hash function being applied to second information that identifies users associated with a set of second user identifiers from second user space according to the PII types;

select one or more other identifiable information types that overlap between the first user space and the second user space, the one or more other identifiable information types representing less personalized information types than the PII types;

generate a mapping between the first user space and the second user space based on (i) a common hash value corresponding to both of a first user identifier from the set of first user identifiers and a second user identifier from the set of second user identifiers, and (ii) a portion of the other identifiable information that corresponds to both of the first user identifier and the second user identifier; and determine, based on the first user space, targeted information directed to the first user identifier; and output, based on the mapping, the targeted information to a user device associated with the second user identifier to target the second user identifier from the second user spacewhile maintaining anonymity of the second user identifier with respect to the first user space.

17. The non-transitory computer-readable storage medium of claim 16, further encoded with instructions that, when executed, cause the one or more processors of the computing system to perform one of:

apply the hash function to the first information for generating the first set of hash values; or apply the hash function to the second information for generating the second set of hash values.

18. The non-transitory computer-readable storage medium of claim 16, wherein the first user space is associated with a merchant loyalty program, wherein the second user space is associated with a social media network service, wherein the targeted information comprises an offer for a product or service associated with the merchant loyalty program, and wherein the non-transitory computer-readable storage medium is further encoded with instructions that, when executed, cause the one or more processors of the computing system to:

receive, from the user device, an indication that the offer was selected while the offer was presented at the user device;

responsive to receiving the indication from the user device, send, to a merchant system associated with the first user space, an indication of the first user identifier of the first user space for triggering the merchant system to apply the offer to future transactions associated with the first user identifier;

receive, from the merchant system, an indication that the offer was redeemed in a transaction associated with the first user identifier; and responsive to receiving the indication that the offer was redeemed in the transaction associated with the first user identifier, perform at least one operation in the second user space.

19. The non-transitory computer-readable storage medium of claim 16, further encoded with instructions that, when executed, cause the one or more processors of the computing system to:

responsive to outputting the targeted information, store, to the non-transitory computer-readable storage medium, a transaction for providing the targeted information to the user device associated with the second user identifier.

20. The method of claim 15, further comprising performing one of:

applying, by the computing system, the hash function to the first information for generating the first set of hash values; or applying, by the computing system, the hash function to the second information for generating the second set of hash values.

21. The method of claim 15, wherein the first and second information each comprise a same type of information.

22. The method of claim 15, wherein the first user space is associated with a merchant loyalty program, wherein the second user space is associated with a social media network service, and wherein the targeted information comprises an offer for a product or service associated with the merchant loyalty program, the method further comprising:

receiving, by the reconciliation system, and from the user device, an indication that the offer was selected while the offer was presented at the user device;

responsive to receiving the indication from the user device, sending, by the reconciliation system and to a merchant system associated with the first user space, an indication of the first user identifier of the first user space for triggering the merchant system to apply the offer to future transactions associated with the first user identifier;

receiving, by the reconciliation system, from the merchant system, an indication that the offer was redeemed in a transaction associated with the first user identifier; and responsive to receiving the indication that the offer was redeemed in the transaction associated with the first user identifier, performing, by the reconciliation system, at least one operation in the second user space.

\* \* \* \* \*